(12) United States Patent
Schleif et al.

(10) Patent No.: US 11,635,750 B2
(45) Date of Patent: Apr. 25, 2023

(54) SYSTEM AND METHOD FOR REMOVABLY INSERTING A SENSOR ASSEMBLY INTO A COMPRESSOR CASING

(71) Applicant: GENERAL ELECTRIC COMPANY, Schenectady, NY (US)

(72) Inventors: Kurt Kramer Schleif, Greenville, SC (US); Andrew David Ellis, Simpsonville, SC (US); Robert David Jones, Simpsonville, SC (US); Stephen Paul Wassynger, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 609 days.

(21) Appl. No.: 16/668,602

(22) Filed: Oct. 30, 2019

(65) Prior Publication Data

US 2021/0132598 A1    May 6, 2021

(51) Int. Cl.
*G05B 23/02*    (2006.01)
*F01D 21/00*    (2006.01)
(Continued)

(52) U.S. Cl.
CPC ......... *G05B 23/0262* (2013.01); *F01D 17/02* (2013.01); *F01D 21/003* (2013.01); *F23N 5/242* (2013.01); *F05D 2230/60* (2013.01); *F05D 2230/64* (2013.01); *F05D 2230/70* (2013.01); *F05D 2230/80* (2013.01); *F05D 2250/294* (2013.01); *F05D 2260/36* (2013.01); (Continued)

(58) Field of Classification Search
CPC ........... G05B 23/0262; F01D 17/02–08; F01D 21/003; F01D 25/24; F01D 25/246; F23N 5/242; F23N 2241/20; G01M 15/02; F05D 2230/60; F05D 2230/64; F05D 2230/70; F05D 2230/80; F05D 2250/294; F05D 2260/36; F05D 2260/38; F05D 2260/80
See application file for complete search history.

(56) References Cited

U.S. PATENT DOCUMENTS 2,623,552 A    12/1952 Compton et al.
2,846,828 A    8/1958 Pilon, Sr.
(Continued)

FOREIGN PATENT DOCUMENTS

CA    2489629 A1    6/2005
EP    2378259 A1    10/2011
(Continued)

OTHER PUBLICATIONS

U.S. Appl. No. 16/668,846, filed Oct. 30, 2019, Kurt Kramer Schleif.
(Continued)

Primary Examiner — Loren C Edwards
(74) Attorney, Agent, or Firm — Fletcher Yoder, P.C.

(57) ABSTRACT

A measurement system for a gas turbine engine is provided. The measurement system comprises a sensor assembly. The measurement system also includes multiple sensors coupled to the sensor assembly. The sensor assembly is configured to be removably inserted within a space defined by a circumferential track embedded within an inner diameter of a casing of the gas turbine engine without having to disassemble the casing.

16 Claims, 9 Drawing Sheets

(51) Int. Cl.
 *F23N 5/24* (2006.01)
 *F01D 17/02* (2006.01)
(52) U.S. Cl.
 CPC ...... *F05D 2260/38* (2013.01); *F05D 2260/80* (2013.01); *F23N 2241/20* (2020.01)

(56) References Cited

U.S. PATENT DOCUMENTS

| | | |
|---|---|---|
| 3,285,137 A | 11/1966 | Hill et al. |
| 3,442,309 A | 5/1969 | Jentsch |
| 3,604,940 A | 9/1971 | Matthews |
| 3,605,729 A | 9/1971 | Liu et al. |
| 3,766,387 A | 10/1973 | Heffan et al. |
| 3,835,591 A | 9/1974 | Cimprich |
| 3,908,444 A | 9/1975 | Peter |
| 4,021,119 A | 5/1977 | Stauffer |
| 4,092,537 A | 5/1978 | Stewart |
| 4,326,804 A | 4/1982 | Mossey |
| 4,395,827 A | 8/1983 | Stowe et al. |
| 4,558,686 A | 12/1985 | Ono |
| 4,566,225 A | 1/1986 | Bizot et al. |
| 4,676,648 A | 6/1987 | Schulz et al. |
| 4,830,449 A | 5/1989 | Spillman, Jr. |
| 4,845,769 A | 7/1989 | Burstein et al. |
| 5,005,353 A | 4/1991 | Acton et al. |
| 5,161,291 A | 11/1992 | Guenther |
| 5,313,513 A | 5/1994 | Prindiville et al. |
| 5,353,551 A | 10/1994 | Nishida |
| 7,029,371 B1 | 4/2006 | Bird |
| 8,054,939 B2 | 11/2011 | Gordon, II et al. |
| 8,074,866 B2 | 12/2011 | Bird |
| 8,096,184 B2 | 1/2012 | Twerdochlib |
| 8,126,254 B2 | 2/2012 | Lasa et al. |
| 8,157,620 B2 | 4/2012 | Corn et al. |
| 8,381,379 B2 | 2/2013 | Holmes et al. |
| 8,444,377 B2 | 5/2013 | Kottilingam et al. |
| 8,519,866 B2 | 8/2013 | Mitchell et al. |
| 9,261,384 B2 | 2/2016 | Schleif et al. |
| 9,458,735 B1 | 10/2016 | Diwinsky et al. |
| 9,494,490 B2 | 11/2016 | Tralshawala et al. |
| 9,623,492 B2 | 4/2017 | Capriotti et al. |
| 10,030,811 B2 | 7/2018 | Schleif et al. |
| 10,180,079 B2 | 1/2019 | Schleif et al. |
| 10,239,132 B2 | 3/2019 | Withey |
| 10,921,113 B1 | 2/2021 | Schleif et al. |
| 10,976,220 B2 | 4/2021 | Schleif et al. |
| 2005/0159079 A1 | 7/2005 | Astigarraga Castanares et al. |
| 2005/0198821 A1 | 9/2005 | Reville et al. |
| 2006/0056960 A1 | 3/2006 | Sabol et al. |
| 2007/0041834 A1 | 2/2007 | Schram et al. |
| 2010/0074727 A1 | 3/2010 | Twerdochlib |
| 2010/0219942 A1 | 9/2010 | Lee |
| 2010/0290906 A1 | 11/2010 | Moeckel et al. |
| 2010/0296911 A1 | 11/2010 | McCallum |
| 2011/0116908 A1 | 5/2011 | Thies |
| 2011/0185570 A1 | 8/2011 | Bird |
| 2011/0229307 A1 | 9/2011 | Lemieux et al. |
| 2012/0182563 A1 | 7/2012 | Kominsky |
| 2012/0325790 A1 | 12/2012 | Chida et al. |
| 2013/0051947 A1 | 2/2013 | Holmes et al. |
| 2013/0322973 A1 | 12/2013 | Holmes |
| 2014/0069460 A1 | 3/2014 | Kell et al. |
| 2014/0376590 A1 | 12/2014 | Hwang et al. |
| 2015/0011322 A1 | 1/2015 | Schleif et al. |
| 2015/0322813 A1 | 11/2015 | Tralshawala et al. |
| 2016/0084637 A1 | 3/2016 | John |
| 2016/0096249 A1 | 4/2016 | Visajtaev |
| 2016/0123528 A1 | 5/2016 | Schleif et al. |
| 2016/0210845 A1 | 7/2016 | Shaw et al. |
| 2017/0248034 A1 | 8/2017 | Dzieciol et al. |
| 2017/0274484 A1* | 9/2017 | Roberts .......... F01D 5/005 |
| 2018/0056406 A1 | 3/2018 | Mery et al. |
| 2018/0156132 A1* | 6/2018 | Dede .......... F01D 5/005 |
| 2018/0202312 A1 | 7/2018 | Schleif et al. |
| 2018/0257189 A1 | 9/2018 | Johnson et al. |
| 2018/0283960 A1* | 10/2018 | Giordan .......... G01M 15/14 |
| 2018/0340441 A1 | 11/2018 | Miyamoto et al. |
| 2019/0072511 A1 | 3/2019 | Warren et al. |
| 2019/0078869 A1 | 3/2019 | Warren et al. |
| 2019/0085730 A1 | 3/2019 | Bae et al. |
| 2019/0181689 A1 | 6/2019 | Oyama et al. |
| 2019/0283146 A1 | 9/2019 | Berube |
| 2019/0353473 A1 | 11/2019 | Warren et al. |
| 2019/0368382 A1 | 12/2019 | Carter et al. |
| 2020/0124030 A1 | 4/2020 | Egedal et al. |
| 2020/0166432 A1 | 5/2020 | Schleif et al. |
| 2020/0173884 A1 | 6/2020 | Dardona |
| 2020/0274236 A1 | 8/2020 | Costello et al. |
| 2020/0392867 A1 | 12/2020 | Schleif et al. |
| 2021/0095707 A1 | 4/2021 | Glaser et al. |
| 2022/0205367 A1 | 6/2022 | Schleif et al. |

FOREIGN PATENT DOCUMENTS

| | | |
|---|---|---|
| FR | 2784179 A1 | 4/2000 |
| GB | 1080726 A | 8/1967 |
| KR | 20040064441 A | 7/2004 |
| WO | 2005016582 A1 | 2/2005 |
| WO | 2019177474 A1 | 9/2019 |

OTHER PUBLICATIONS

U.S. Appl. No. 16/669,455, filed Oct. 30, 2019, Kurt Kramer Schleif.
U.S. Appl. No. 16/669,463, filed Oct. 30, 2019, Kurt Kramer Schleif.
U.S. Appl. No. 16/669,466, filed Oct. 30, 2019, Kurt Kramer Schleif.
European Search Report for EP Application No. 20202156.4 dated Mar. 15, 2021; 8 pgs.
European Search Report for EP Application No. 20201900.6 dated Apr. 1, 2021; 9 pgs.
European Search Report for EP Application No. 20201905.5 dated Feb. 24, 2021; 10 pgs.

* cited by examiner

SYSTEM AND METHOD FOR REMOVABLY INSERTING A SENSOR ASSEMBLY INTO A COMPRESSOR CASING

BACKGROUND

The subject matter disclosed herein relates to a gas turbine system and, more particularly, to a system and method for removably inserting a sensor assembly into a casing of the gas turbine system.

Gas turbines are used to generate power for various applications. Typically, testing and validation are performed on these gas turbines prior to their utilization (e.g., in a power generating station). Effective testing and validation can increase the efficiency of and productivity of the gas turbines as well as the power generating station. Sometimes, measurement systems may be invasively coupled to the gas turbines, which require the disassembly of the turbines for the coupling of the measurement systems and/or the introduction of holes in the casings for sensors. In addition, removal of the measurement systems may also necessitate the disassembly of the casings and/or shut down of the gas turbines. Thus, testing and validation of the gas turbines may be time consuming and expensive and may risk damage to the gas turbine engines.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a measurement system for a gas turbine engine is provided. The measurement system includes a sensor assembly. The measurement system also includes multiple sensors coupled to the sensor assembly. The sensor assembly is configured to be removably inserted within a space defined by a circumferential track embedded within an inner diameter of a casing of the gas turbine engine without having to disassemble the casing.

In another embodiment, a system is provided. The system includes a gas turbine engine including a compressor including a compressor casing having an inner diameter, a combustor downstream of the compressor, and a turbine downstream of the combustor. The gas turbine engine also includes a circumferential track embedded within an inner diameter of the compressor casing, wherein the circumferential track extends about at least a portion of the inner diameter of the compressor casing in a circumferential direction relative to a longitudinal axis of the gas turbine engine. The system also includes a measurement system. The measurement system includes a sensor assembly, which includes multiple sensors coupled to the sensor assembly. The sensor assembly is configured to be removably inserted within the circumferential track without having to disassemble the compressor casing.

In a further embodiment, a method is provided. The method includes inserting a sensor assembly having multiple sensors into a cavity formed by a circumferential track embedded within an inner diameter of a compressor casing of a gas turbine engine without having to disassemble the compressor casing. The method also includes acquiring, via the multiple sensors, baseline data for validating an operation of the gas turbine engine independent of a control system for the gas turbine engine.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include a measurement system (e.g., aeromechanics measurement system) for validating the operation of a gas turbine engine. The measurement system may include a sensor assembly (e.g., a wire rope, tube, or chain) to which are coupled a plurality of sensors. The sensor assembly is configured to be inserted within a circumferential track embedded within an inner diameter of a casing (e.g., compressor casing) of the gas turbine engine. In particular, the sensor assembly is inserted within a space or cavity defined between the inner diameter of the casing and the circumferential track. The circumferential track extends in a circumferential direction relative to a longitudinal axis of the gas turbine engine. The sensor assembly is configured to be inserted and/or removed via a single port coupled to, and in communication with, the space or cavity formed by the circumferential track without the casing being disassembled and/or shut down.

The measurement system may collect validation data (e.g., data associated with one or more operational parameters of the gas turbine engine) independent of a control system for the gas turbine engine. In addition, the data collected by the measurement system may be collected after removal of the sensor assembly from the casing, thus avoiding the use of a slip ring or telemetry. The measurement system may be rapidly deployed. In addition, the measurement system is configured to be utilized with gas turbine engines of different sizes and from different manufacturers.

Figure 1:
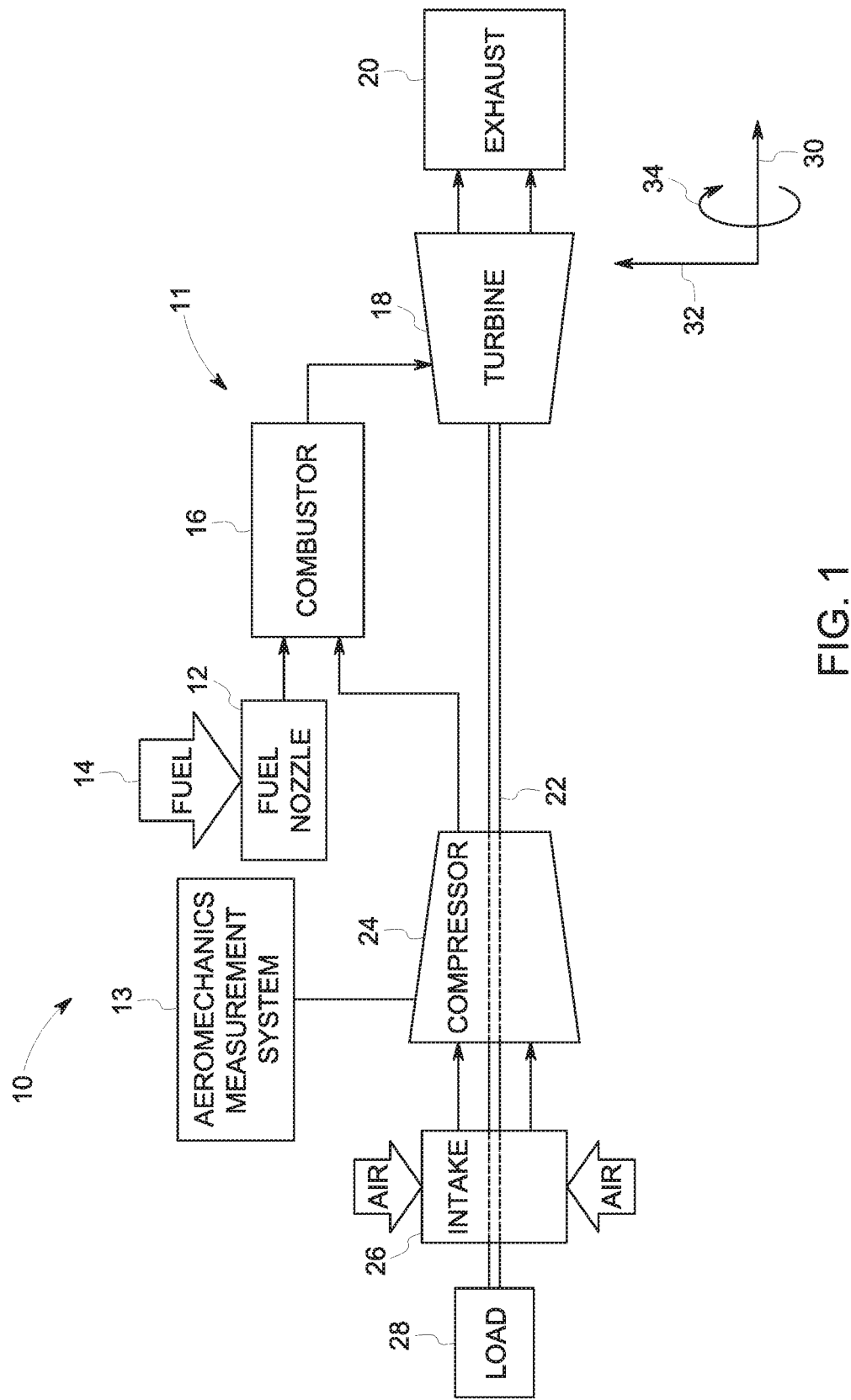
FIG. 1 is a block diagram of an embodiment of a turbine system having a removable aeromechanics measurement system.

Turning to the figures, FIG. 1 is a block diagram of an embodiment of a turbine system 10 having a gas turbine engine 11. For reference, the gas turbine engine 11 may extend in axial direction 30 (e.g., relative to a longitudinal axis 36 of gas turbine engine 11, see FIG. 2), a radial direction 32 toward or away from the longitudinal axis 36, and a circumferential direction 34 around the longitudinal axis 36. As described in detail below, the disclosed turbine system 10 employs a removable measurement system 13 (e.g., aerodynamics measurement system). The measurement system 13 may include a sensor assembly (wire rope or tube or chain) to which a plurality of sensors are coupled, which measure a variety of operational parameters utilized to provide baseline data in validating the operation of the gas turbine engine 11. The measurement system 13 operates independent of the control system for the gas turbine engine 11. In certain embodiments, the measurement system 11 may be coupled to the control system of the gas turbine engine 11 to enable real-time monitoring and/or control.

Figure 3:
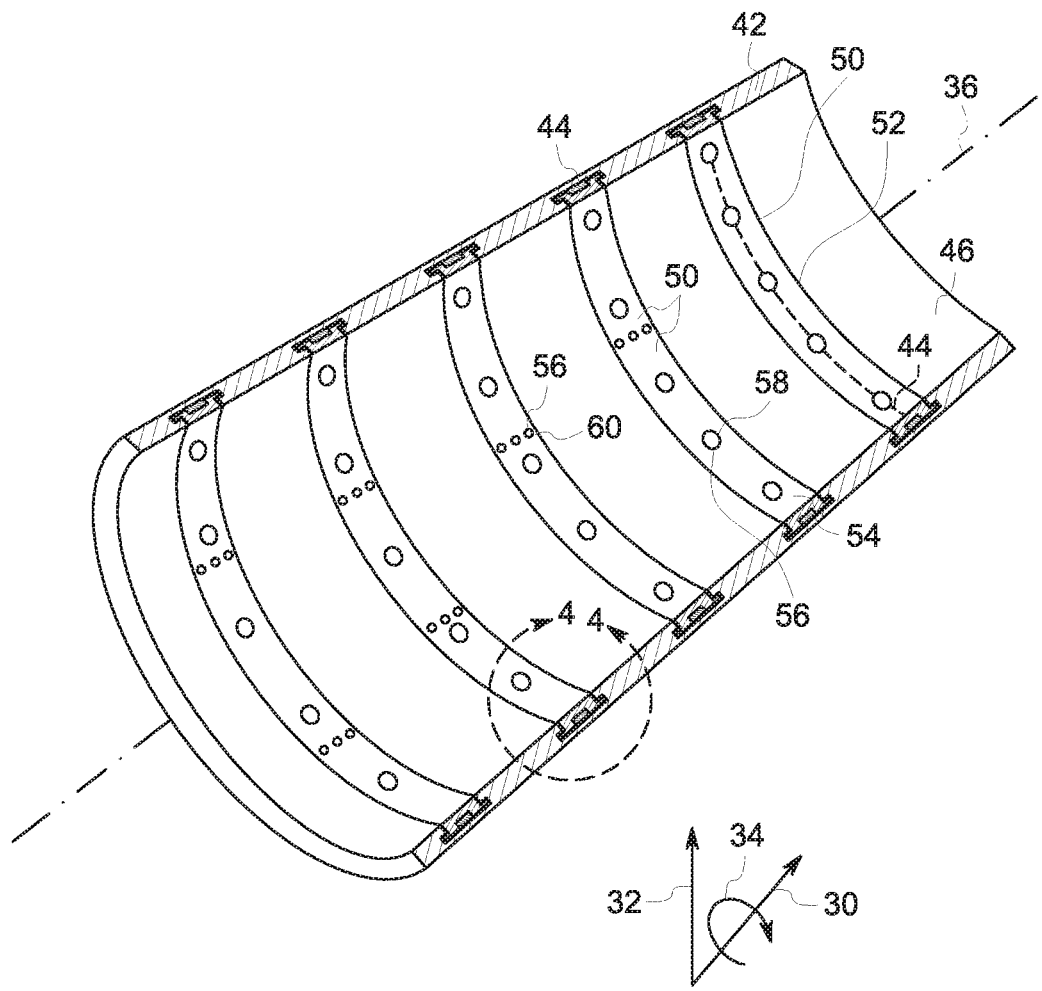
FIG. 3 is a perspective view of an embodiment of an inner surface of a portion of a casing (e.g., compressor casing) for a gas turbine engine having multiple circumferential tracks.

The sensor assembly may be removably and rapidly inserted within a space or cavity defined by a circumferential track embedded within an inner surface or diameter of a casing (e.g., compressor casing) of the gas turbine engine 11. The circumferential track extends in the circumferential direction 34 relative to a longitudinal axis 36 of the gas turbine engine 11. In certain embodiments (as shown in FIG. 3), the casing may include a plurality of circumferential tracks spaced apart from each apart in the axial direction 30. The sensor assembly may be utilized in any of the circumferential tracks. In certain embodiments, the measurement system 13 may include a plurality of sensor assemblies each having a plurality of sensors, where the sensor assemblies may be inserted into multiple circumferential tracks.

The number of sensors may range from a dozen to a hundred to thousands of sensors. At least some of the sensors may employ optics and/or fiber optics. The operational parameters measured by the sensors may include blade tip timing (e.g., for displacement, stress, frequency, etc.), blade tip clearance, temperature, dynamic pressure, static pressure, rotor vibration, stall detection, and rotor speed. The sensors may acquire the data and, once the sensor assembly is removed from the circumferential track, the data may be collected from the sensors, thus avoiding the need for a slip ring or telemetry. In certain embodiments, extensions of cabling may be coupled to the measurement system 13 from outside the gas turbine engine 11 to enable real-time monitoring.

The turbine system 10 may use liquid or gas fuel, such as natural gas and/or a synthetic gas, to drive the turbine system 10. As depicted, one or more fuel nozzles 12 in a combustor 16 intake a fuel supply 14, partially mix the fuel with air, and distribute the fuel and the air-fuel mixture into the combustor 16 where further mixing occurs between the fuel and air. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
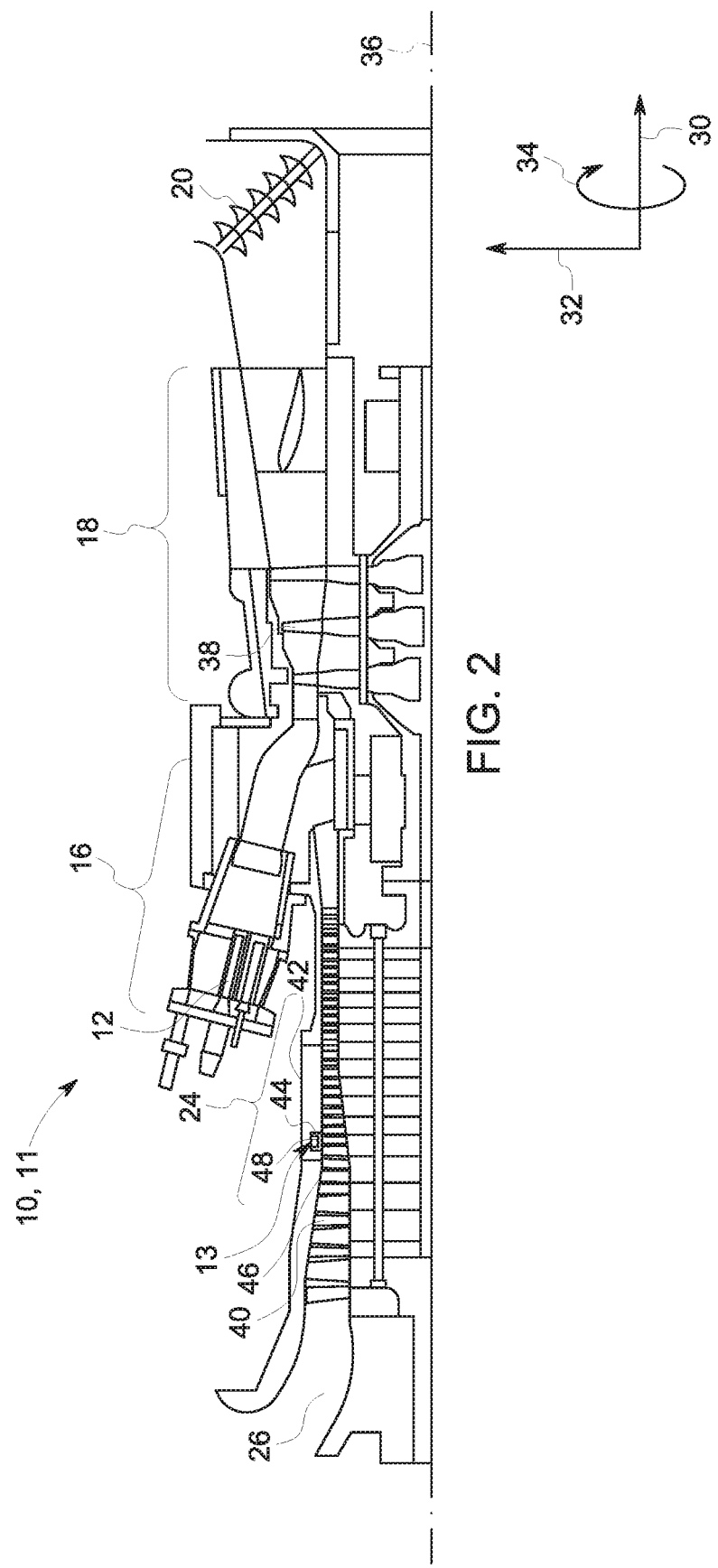
FIG. 2 is a cross-sectional side view of an embodiment of the turbine system, as illustrated in FIG. 1, with the removable aeromechanics measurement system.

FIG. 2 is a cross-sectional side view of an embodiment of the gas turbine engine 11 as illustrated in FIG. 1. The gas turbine engine 11 has a longitudinal axis 36. In operation, air enters the gas turbine engine 11 through the air intake 26 and is pressurized in the compressor 24. The compressed air then mixes with gas for combustion within the combustor 16. For example, the fuel nozzles 12 may inject a fuel-air mixture into the combustor 16 in a suitable ratio for optimal combustion, emissions, fuel consumption, and/or power output. The combustion process generates hot pressurized exhaust gases, which then drive turbine blades 38 within the turbine 18 to rotate the shaft 22 and, thus, the compressor 24 and the load 28. The rotation of the turbine blades 38 causes a rotation of the shaft 22, thereby causing blades 40 (e.g., compressor blades) within the compressor 24 to draw in and pressurize the air received by the intake 26.

As depicted, a casing 42 (e.g., compressor casing) surrounds the blades 40 (and stator vanes) of the compressor 24. The casing 42 may include multiple sections (e.g., two halves) that together extend completely about the longitudinal axis 36 to define the interior of the compressor 24. A circumferential track 44 is embedded within an inner surface or diameter 46 of the casing 42. The measurement system 13 includes the sensor assembly 48 having the plurality of sensors, which is disposed within a space or cavity defined between the circumferential track 44 and the inner diameter 46 of the casing 42. The sensor assembly 48 is at least slightly flexible or bendable to enable it bend in the circumferential direction 34 when disposed within the space or cavity. The circumferential track 44 is axially 30 disposed between the rows of stator vanes (not separately numbered)

so that the circumferential track 44 and the sensors of the sensor assembly 48 are in the plane of (and axially 30 aligned with) the rotating blades 40. The circumferential track 44 extends in the circumferential direction 34 about at least a portion of the inner diameter 46 of the casing 42. In certain embodiments, the circumferential track 44 extends about the entire inner diameter 46 of the casing 42.

FIG. 3 is a perspective view of an embodiment of the inner surface 46 of a portion of the casing 42 (e.g., compressor casing) for the gas turbine engine 11 having multiple circumferential tracks 44. The stator vanes and the respective slots for receiving them are not shown. The number of circumferential tracks 44 may vary. In certain embodiments, the number of circumferential tracks 44 may correspond to the number of stages of blades 40. In other embodiments, the number of circumferential tracks 44 may be less than or greater than the number of stages of blades 40. As depicted, the circumferential tracks 44 are axially 30 spaced apart from each other relative to the longitudinal axis 36. As mentioned above, each circumferential track 44 is axially 30 disposed between the rows of stator vanes so that the respective circumferential track 44 and the sensors of the sensor assembly 48 are in the plane of (and axially 30 aligned with) the rotating blades 40. Each circumferential track 44 extends in the circumferential direction 34 about at least a portion of the inner diameter 46 of the casing 42. In certain embodiments, at least one of the circumferential tracks 44 extends about the entire inner diameter 46 of the casing 42.

In certain embodiments, the circumferential track 44 is a single segment 50 as depicted with circumferential track 52. In other embodiments, the circumferential track 44 may include multiple segments 50 as depicted with circumferential track 54. Each circumferential track 44 includes openings 56 that enable the sensors of a sensor assembly 48 (see also FIG. 5) to face toward an interior of the compressor 24 (e.g., toward the blades 40) when the sensor assembly 48 is properly inserted within the space defined by the circumferential track 44 and the inner diameter 46 of the casing 42. The openings 56 may include larger openings 58 and smaller openings 60 sized for specific sensors. In certain embodiments, the openings 56 may be aligned in the circumferential direction 34 or in the axial direction 30. Each opening 56 represents a measurement point that consists of a sensor head and a sensor receptacle for receiving the sensor head as described in greater detail below. The opening 56 provides a viewport for the respective sensor head when inserted within the sensor receptacle. The position of each sensor receptacle may be permanently fixed. Each sensor receptacle may be integrated within the circumferential track 44 or embedded directly within the inner diameter 46 of the casing 42.

Figure 4:
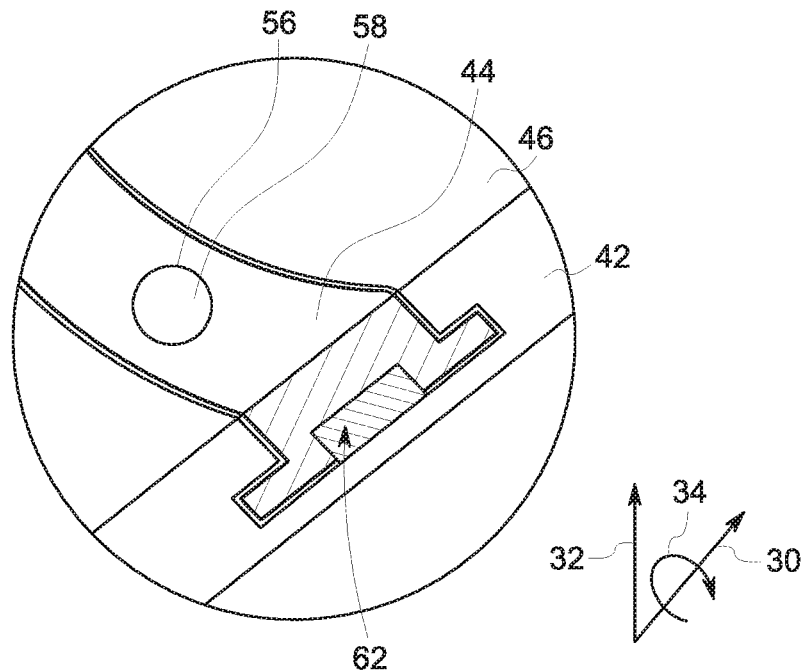
FIG. 4 is a perspective view of an embodiment of a portion of a circumferential track embedded in the inner surface of the casing, taken within line 4-4 of FIG. 3.
Figure 5:
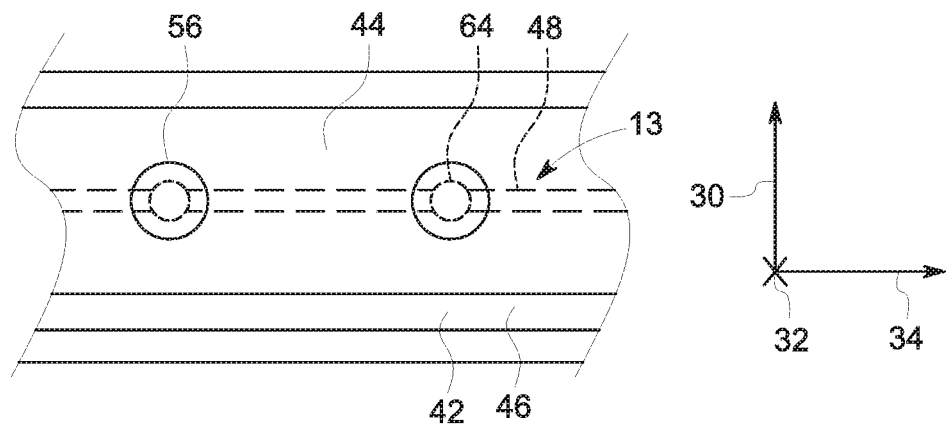
FIG. 5 is a top schematic view of an embodiment of a sensor assembly disposed within a cavity defined by a circumferential track.

As depicted in FIG. 4, a space or cavity 62 is defined between the circumferential track 44 and the inner surface 46 of the casing 42. The sensor assembly 48 may be inserted and/or removed into the space or cavity 62. As depicted in FIG. 5, sensors 64 coupled to the sensor assembly 48 are spaced apart or spatially arranged so that the sensors 64 align with the openings 56 on the circumferential track 44 when the sensor assembly 48 is completely inserted into the space or cavity 62.

Figure 6:
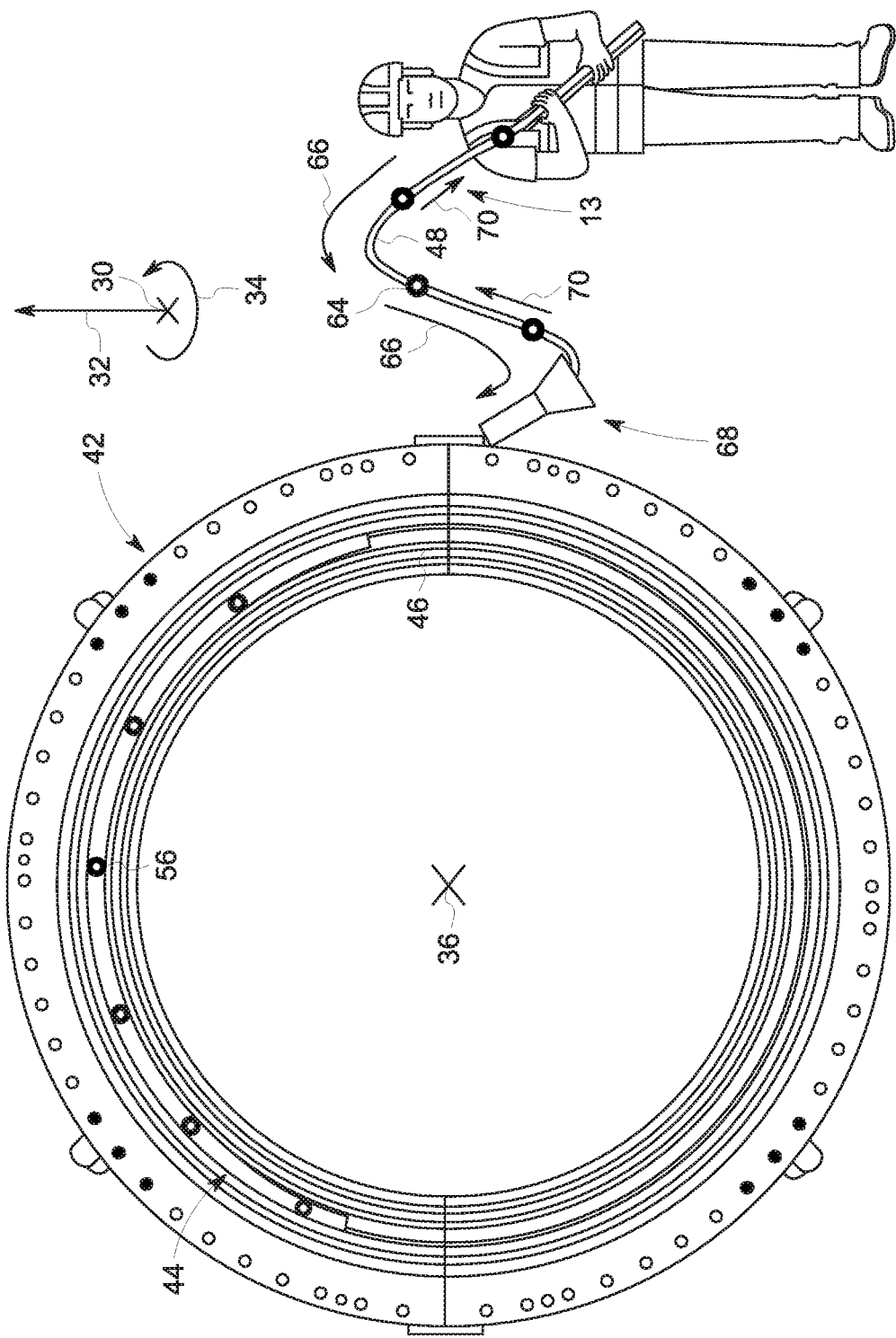
FIG. 6 is schematic view of an embodiment of the measurement system of FIG. 1 being inserted into a cavity defined by the circumferential track and the inner surface of the casing.

FIG. 6 is schematic view of the measurement system 13 being inserted into the cavity 62 defined by the circumferential track 44 and the inner surface 46 of the casing 42. The sensor assembly 48 with the sensors 64 is inserted, as indicated by the arrows 66, from outside the casing 42 (e.g., with the entire gas turbine engine 11 assembled) into the cavity defined by circumferential track 44 and the inner surface of the casing 42 via a single port 68 that is coupled to the cavity 62. The sensor assembly 48 is fed through the port 68 and curves within the cavity 62 in the circumferential direction 34. The sensor assembly 48 may be removed in the opposite direction via the same port 68 as indicated by the arrows 70.

Figure 7:
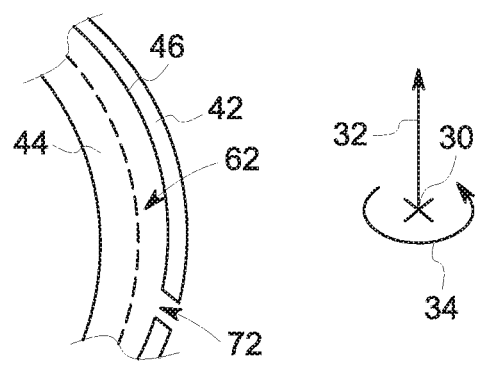
FIG. 7 is a schematic view of an embodiment of a port coupled to a cavity defined by the circumferential track and the inner surface of the casing.

As depicted, the port 68 (e.g., a funnel) is external to the casing 42. In certain embodiments, as depicted in FIG. 7, the casing 42 defines a port 72, which extends to the cavity 62 defined by the circumferential track 44 and the inner surface 46 of the casing 42. An external port (e.g., a funnel, such as port 68) may be inserted into the port 72 to help guide the insertion and/or removal of the sensor assembly 48 from within the space or cavity 62.

In certain embodiments, where the inner surface 46 of the casing 42 has more than one circumferential track 44, the casing 42 may include multiple ports with a single port dedicated (i.e., for exclusive use) for each respective circumferential track 44 for the insertion and/or removal of a respective sensor assembly 48. In other embodiments, where the circumferential track 44 includes two or more segments 50, multiple ports 72 may be disposed in communication with a respective cavity 62 defined by the cavity 62 of the segment 50.

Figure 8:
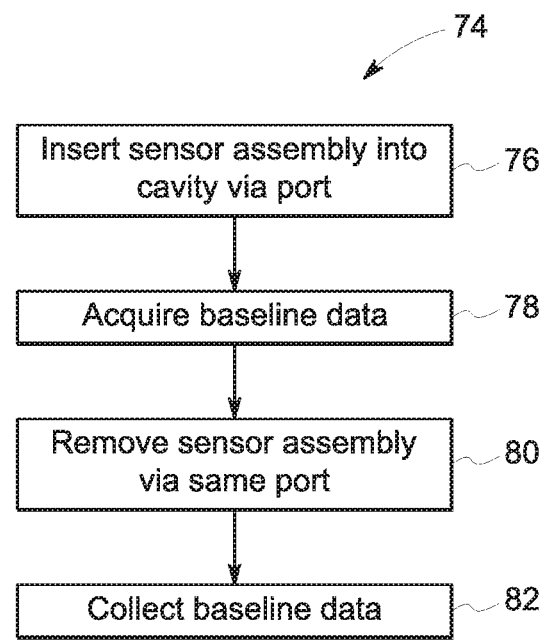
FIG. 8 is a flow chart of an embodiment of a method for utilizing the measurement system of FIG. 1.

FIG. 8 is a flow chart of an embodiment of a method 74 for utilizing the measurement system 13. The method 74 includes inserting the sensor assembly 48 having the sensors 64 into the cavity 62 formed by the circumferential track 44 and the inner diameter 46 of the casing 42 without having to disassemble the casing 42 and/or without having to shut down the gas turbine engine 11 (block 76). The insertion occurs via a single port coupled to, or in communication, with the cavity 62.

The method 74 also includes acquiring, via the sensors 64, baseline data (e.g., during operation of the gas turbine engine 11) for validating an operation of the gas turbine engine 11 (block 78). The data is acquired independent of a control system of the gas turbine engine 11. The data is stored in a memory.

The method 74 further includes removing the sensor assembly 48 from the cavity 62 (e.g., via the same port utilized for insertion) without having to disassemble the casing 42 and/or without having to shut down the gas turbine engine 11 (block 80).

The method 74 still further includes collecting the acquired baseline data from the sensors 64 after the removal of the sensor assembly 48 from the cavity 62 (block 82). In other embodiments, the data may be collected from the sensors 64 in real-time, while the sensor assembly 48 is still installed within the cavity 62 of the circumferential track 44.

Figure 9:
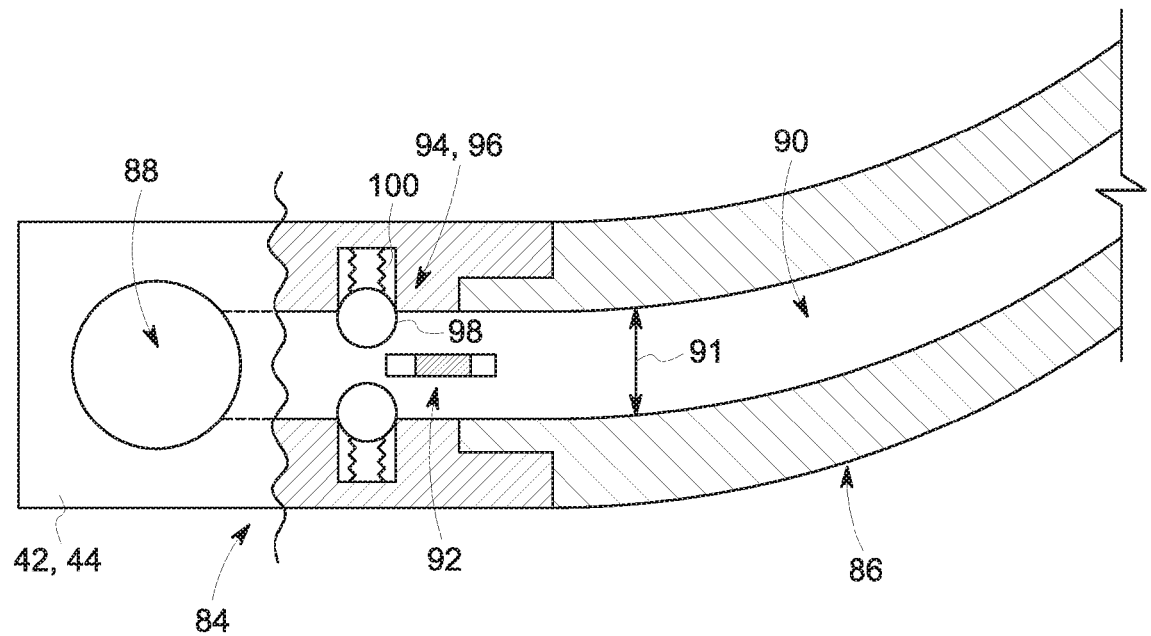
FIG. 9 is a schematic view of an embodiment of a sensor receptacle coupled to a guide tube.

FIG. 9 is a schematic view of an embodiment of a sensor receptacle 84 coupled to a guide tube 86. Each sensor receptacle 84 may be integrated within the circumferential track 44 or embedded directly within the inner diameter 46 of the casing 42. The position of each sensor receptacle 84 may be permanently fixed. The sensor receptacle 84 includes a sensor viewport or opening 88 (e.g., opening 56 in FIGS. 3-5) that provides a viewport for a sensor head when inserted within the sensor receptacle 84. The sensor receptacle 84 is coupled to the guide tube 86 which includes an internal passage 90 for receiving the sensor head. The guide tube 86 has an inner diameter 91 that is larger than the sensor that will be through it. The guide tube 86 is generally flexible or semi-flexible to permit routing. As described in greater detail below, the guide tube 86 is routed circumferentially in a passage machined in the casing 42 to a point at which it passes through a port in the casing to the outside, where it can be accessed. In certain embodiments, the guide tube 86 may be inside of the track 44 that is installed on the inner diameter 46 of the casing 42.

The sensor receptacle 84 includes an alignment feature 92 (e.g., clocking key) for orienting the sensor head within the sensor receptacle 84 so that the sensor head is aligned with the viewport 88. The sensor head includes a corresponding feature (e.g., keyway) to engage the alignment feature 92. An operator may need to twist a cable associated with the sensor head to line up the alignment feature and the keyway. In certain embodiments, the sensor receptacle 84 and/or the sensor head may include a self-aligning feature that automatically turns the sensor head to the proper orientation.

The sensor receptacle 84 also includes a feature 94 (e.g., locking feature) for locking the inserted sensor head. In certain embodiments, the feature 94 may be a one-time, irreversible locking feature. In other embodiments, the feature 94 may be a reversible locking feature that can be overcome by a force or released by an unlocking mechanism. As depicted in FIG. 9, the feature 94 one or more spring-loaded ball detents 96 (e.g., two ball detents are depicted in FIG. 9). Each ball detent 96 includes a ball 98 and one or more springs 100. The spring-loaded ball detents 96 engage a corresponding feature in the sensor head. The spring load of the balls 98 is sufficient to keep inadvertent pulling on the sensor cable from dislodging the sensor head from the sensor receptacle 84. In certain embodiments, an intentional and large enough pulling force is able to overcome the spring loaded ball detents 96 to release the sensor head from the sensor receptacle 84.

Figure 10:
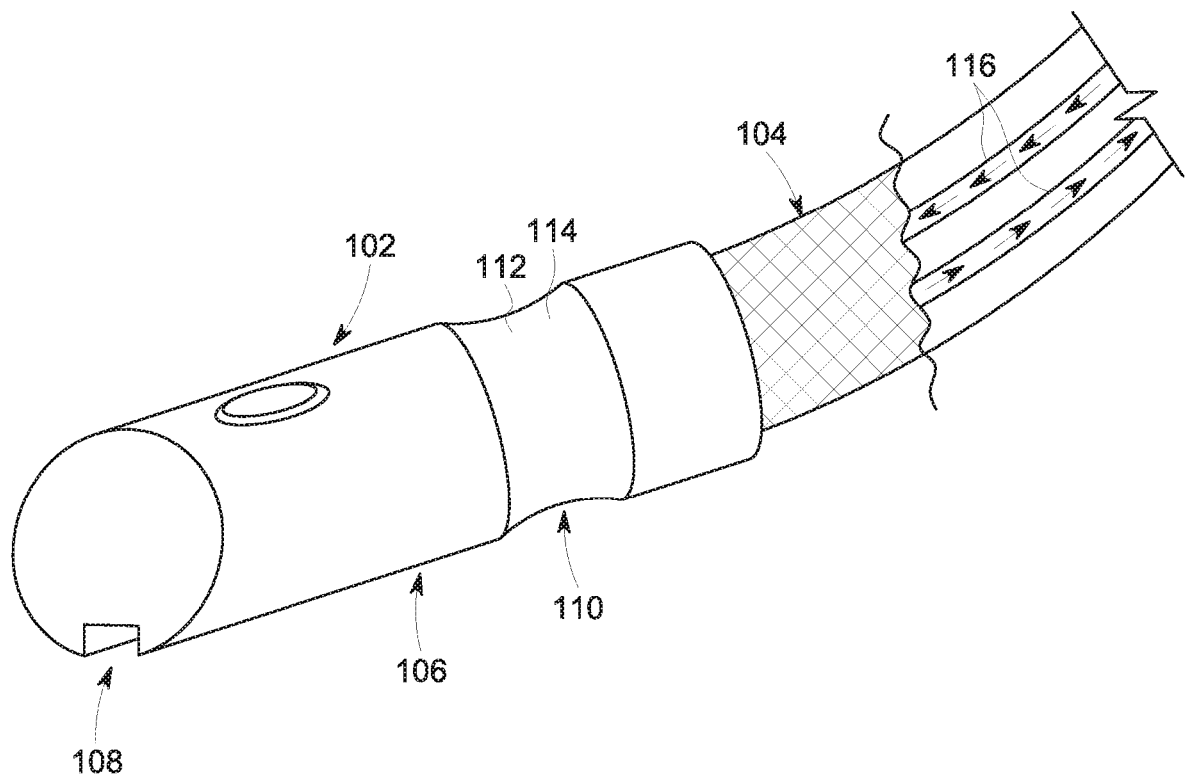
FIG. 10 is a schematic view of an embodiment of a sensor coupled to a portion of a cable.
Figure 11:
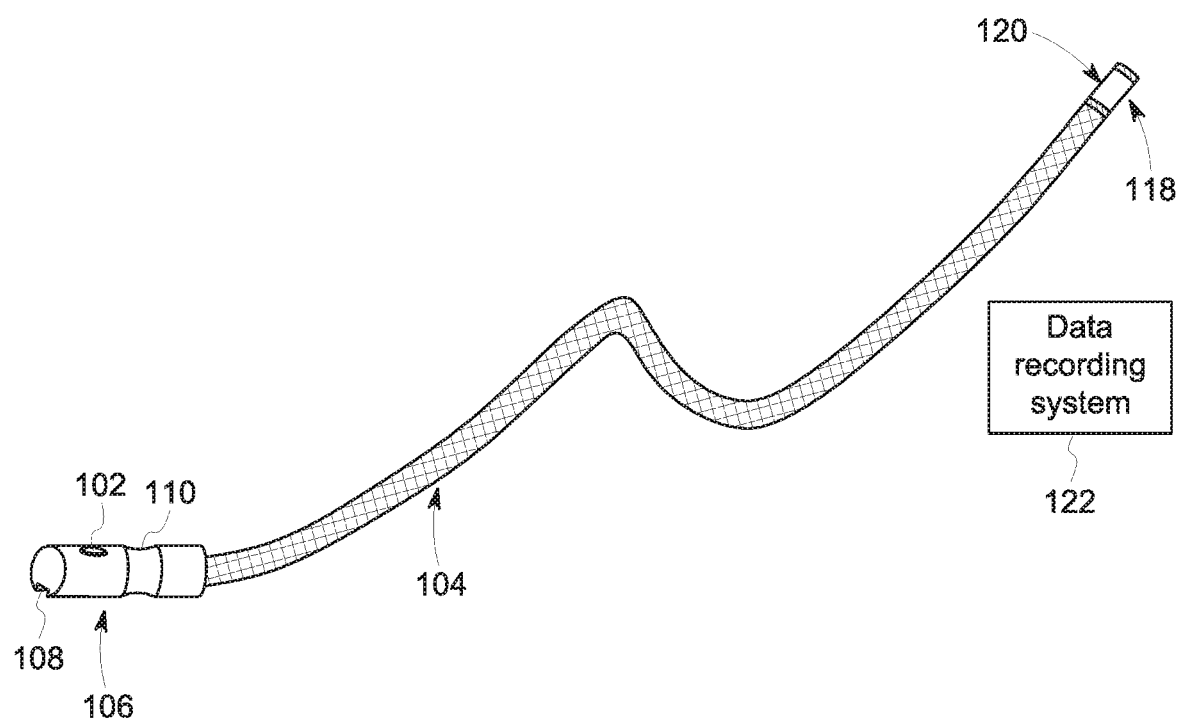
FIG. 11 is a schematic view of an embodiment of the sensor of FIG. 10 coupled to the cable.

FIGS. 10 and 11 are schematic views of an embodiment of a sensor 102 coupled to a cable 104. In particular, the sensor 102 is part of a sensor head 106 coupled to the cable 104. The sensor head 106 includes a corresponding alignment feature 108 (e.g., keyway slot) that enables alignment of the sensor 102 with the viewport 88 as described above when interacting with alignment feature 92. The sensor head 106 also includes a corresponding locking feature 110 (e.g., ball detent locking feature) that interacts with the locking feature 94 to lock the sensor head 106 in place with the sensor receptacle 84. For example, the corresponding locking feature 110 includes a groove 112 on an outer surface 114 of the sensor head 106.

The cable 104 acts as a conduit for signals 116 to pass from the sensor to a remotely located data recording system. The signals may be optical, electrical, or any other form of data/power transmission. An end 118 of the cable 104 opposite the sensor head 106 includes a connector interface 120 (see FIG. 11) to interface with the data recording system 122.

Figure 12:
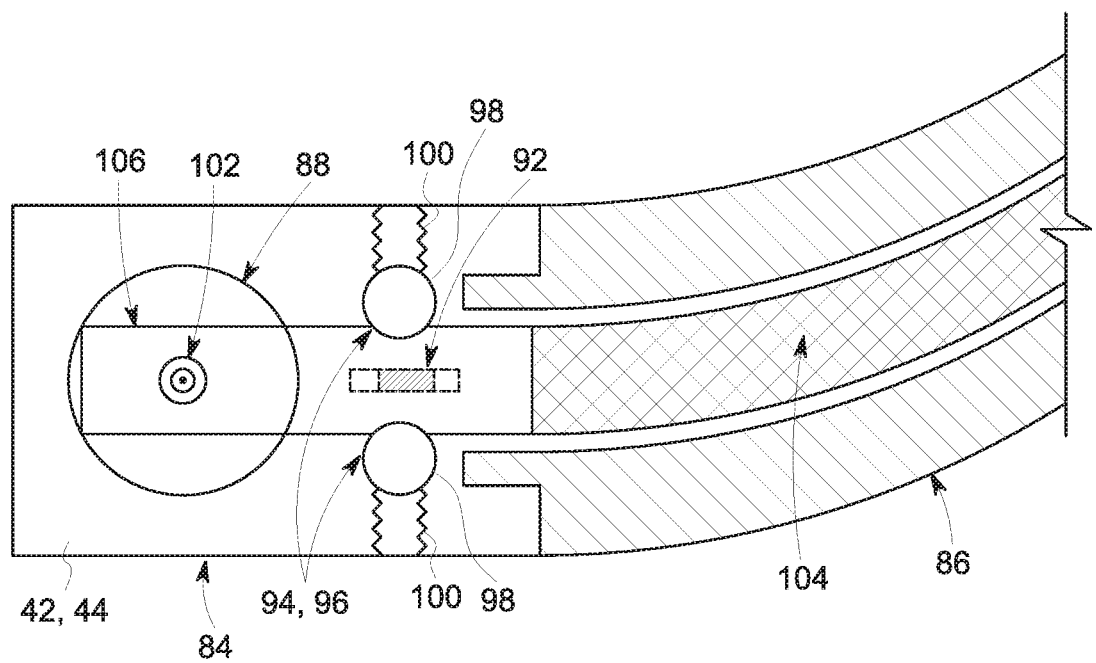
FIG. 12 is a schematic view of the sensor in FIG. 10 coupled within the sensor receptacle of FIG. 9.

The semi-flexible, semi-rigid cable 104 connected to the sensor head 106 enables the operator to push the sensor head 106 (and cable 104) down a length of the guide tube 86. When the sensor head 106 reaches the sensor receptacle 84, the operator will initially feel resistance as the sensor head 106 pushes against the spring-loaded ball detents 96. With a reasonable amount of force, the sensor head 106 will seat in the sensor receptacle 84 and the ball detents 96 will engage the sensor head 106 as illustrated in FIG. 12. In addition, as depicted in FIG. 12, the sensor 102 is aligned with the sensor viewport 88 due to the interaction between the alignment features 92, 108. The same cable 104 also enables the removal of the sensor head from the guide tube 86. For example, if the sensor 102 fails or at the conclusion of a test, the operator can withdraw the sensor head 106 from the guide tube 86 by pulling on the cable 104 attached to the sensor head 106. In certain embodiments, the sensor head 106 and/or the sensor receptacle 84 may include a release feature to unlock the sensor head 106 from the sensor receptacle 84.

The operator can confirm that the sensor head 106 is seated in a number of ways. In a certain embodiments, the sensor head 106 is seated via feel by the operator and the operator's experience with how ball detents 96 operate. In other embodiments, the operator may receive feedback from the sensor 102 that indicates that it can see the target (i.e., sensor receptacle 84). In some embodiments, the sensor head 106 and/or sensor receptacle 84 may be equipped with a simple electrical contact that provide confirmation that the sensor head 106 is properly seated (e.g., via completion of an electrical circuit).

Figure 13:
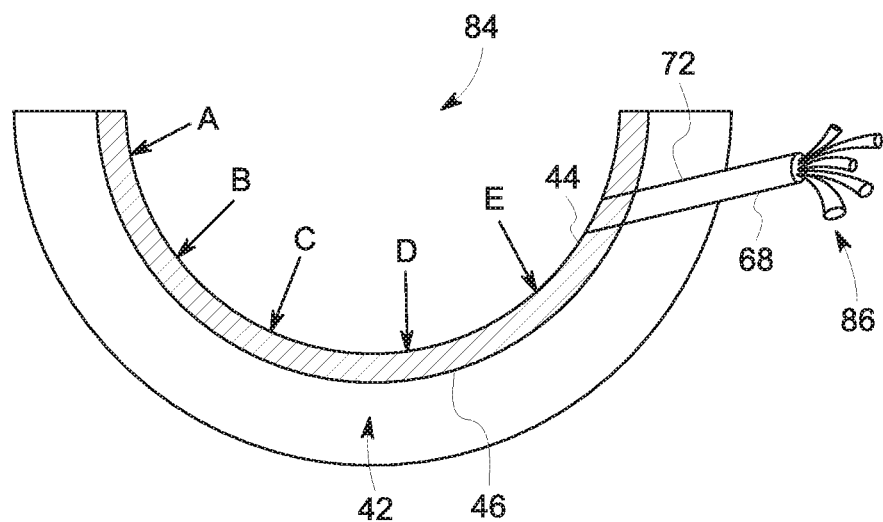
FIG. 13 is a schematic view of an embodiment of guide tubes for sensors extending from a port into a cavity between a circumferential track and an inner surface of a casing.
Figure 14:
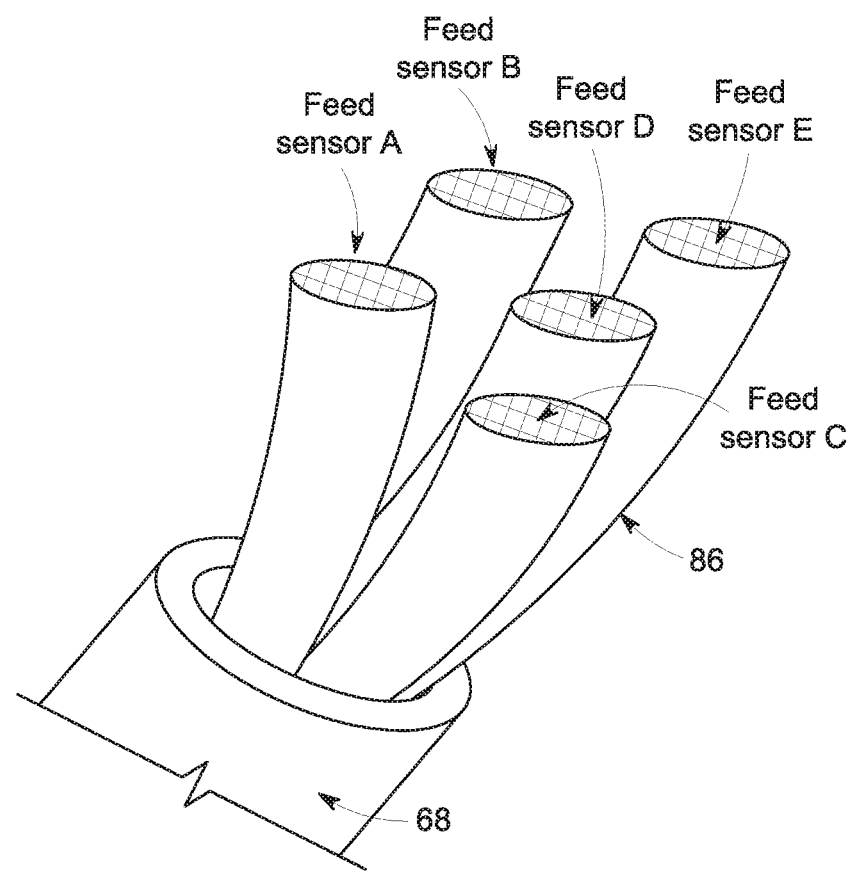
FIG. 14 is a schematic view of embodiment of the guide tubes of FIG. 13 extending from the port.

FIG. 13 is a schematic view of an embodiment of the guide tubes 86 for the sensors 102 extending from the port 72 into a cavity between the circumferential track 44 and the inner surface 46 of the casing 42. As depicted, only a portion of casing 42 and the circumferential track 44 are shown. The circumferential track 44 includes a number of receptacles 84 (e.g., receptacles A, B, C, D, and E) for receiving the sensors 102. In certain embodiments, the receptacles 84 may be embedded on the inner surface 46 of the casing 42. The casing 42 includes the opening or port 72 as described above that extends from a cavity between the circumferential track 44 and the inner surface 46 of the casing 42 to an outer surface of the casing 42. The external port, receptacle, or funnel 68 is disposed within the port 72 and extends from the cavity between the circumferential track 44 and the inner surface 46 of the casing 42 to outside of the casing 42. As depicted in FIG. 13 (and in greater detail in FIG. 14), a plurality of guides tubes 86 for the a plurality of the sensors 102 (e.g., sensors A, B, C, D, and E) may be disposed within the cavity between the circumferential track 44 and the inner surface 46 of the casing 42 (as described above) and extend from the external port 68. The operator feeds the sensor head 106 into the appropriate guide tube 86 accessible on the outside of the casing 42 through the external port 68. In embodiments with multiple guide tubes 86, the guide tubes may be labeled or mapped. In certain embodiments, instead of guide tubes 86, discrete passages for receiving the sensor heads 106 and associated sensor cables 104 may be fabricated within the circumferential track 44.

Technical effects of the disclosed embodiments include providing an aeromechanics measurement system that may be rapidly deployed on a gas turbine engine for acquiring baseline data for validating an operation of a gas turbine engine. The measurement system may collect the data independent of a control system for the gas turbine engine. The measurement system includes a sensor assembly having multiple sensors coupled to it. The sensor assembly may be inserted into and subsequently withdrawn (e.g., via the same port) from a cavity or space defined between a circumferential track embedded within an inner surface of a casing and the inner surface of the casing. The sensor assembly may be inserted and removed without having to disassemble the gas turbine engine. This enables the baseline data to be gathered without having to utilize a slip ring or telemetry. The measurement system is adaptable for use with gas turbine engines of different sizes and from different manufacturers. In addition, the measurement system may reduce costs and time associated with testing and validating the gas turbine engine.

This written description uses examples to disclose the disclosed subject matter, including the best mode, and also to enable any person skilled in the art to practice the disclosed subject matter, including making and using any devices or systems and performing any incorporated methods. The patentable scope of the disclosed subject matter is defined by the claims and may include other examples that occur to those skilled in the art. Such other examples are intended to fall within the scope of the claims if they have structural elements that do not differ from the literal language of the claims or if they include equivalent structural elements with insubstantial differences from the literal language of the claims.

The invention claimed is:

1. A measurement system for a gas turbine engine, comprising:
a sensor assembly; and
a plurality of sensors coupled to the sensor assembly, wherein, from outside a casing of the gas turbine engine, the sensor assembly is configured to be removably inserted into and removed from a space defined by both an inner surface of a casing wall of the casing and a circumferential track disposed within the casing wall, via a single port coupled to the space, without having to disassemble the casing, wherein the circumferential track extends along the casing wall in direct contact with the casing wall, and wherein the circumferential track encloses the plurality of sensors within the space when the sensor assembly is inserted into the space.

2. The measurement system of claim 1, wherein the measurement system is configured to acquire baseline data during an operation of the gas turbine engine for validating the operation of the gas turbine engine, wherein the operation of the gas turbine engine utilizes combustion in a combustor of the gas turbine engine to drive a compressor of the gas turbine engine.

3. The measurement system of claim 2, wherein the measurement system is configured so that the baseline data is collected from the plurality of sensors after removal of the sensor assembly from the casing.

4. The measurement system of claim 1, wherein the measurement system is configured to operate independent of a control system of the gas turbine engine.

5. The measurement system of claim 1, wherein the sensor assembly is configured to extend circumferentially, relative to a longitudinal axis of the gas turbine engine, along at least a portion of the casing in the space defined within the inner surface of the casing wall.

6. The measurement system of claim 1, wherein each sensor of the plurality of sensors is spatially arranged so that each sensor is configured to align with a respective opening of a plurality of openings on the circumferential track facing toward an interior defined by the casing when the sensor assembly is inserted within the space.

7. The measurement system of claim 1, wherein the casing comprises a compressor casing.

8. A turbine system comprising:
a gas turbine engine, comprising:
a compressor comprising a compressor casing wall having an inner surface;
a combustor downstream of the compressor;
a turbine downstream of the combustor;
a circumferential track disposed within the compressor casing wall, wherein the circumferential track extends along the compressor casing wall in direct contact with the compressor casing wall; and
a circumferential cavity defined by both the inner surface of the compressor casing wall and the circumferential track, wherein the circumferential cavity extends about at least a portion of the inner surface of the compressor casing wall in a circumferential direction relative to a longitudinal axis of the gas turbine engine; and
a measurement system, comprising:
a sensor assembly; and
a plurality of sensors coupled to the sensor assembly, wherein the sensor assembly is configured to be removably inserted within and removed from the circumferential cavity from outside the compressor casing wall, via a single port coupled to the circumferential cavity, without having to disassemble a compressor casing, wherein the circumferential track encloses the plurality of sensors within the circumferential cavity when the sensor assembly is inserted into the circumferential cavity.

9. The turbine system of claim 8, further comprising a funnel for engaging the single port, the funnel being configured to facilitate insertion and removal of the sensor assembly.

10. The turbine system of claim 8, wherein the circumferential track comprises a plurality of openings facing toward an interior of the compressor and spaced apart along the circumferential track in the circumferential direction, and each sensor of the plurality of sensors is spatially arranged so that each sensor is configured to align with a respective opening of the plurality of openings when the sensor assembly is inserted within the circumferential cavity.

11. The turbine system of claim 8, wherein the measurement system is configured to acquire baseline data during an operation of the gas turbine engine for validating the operation of the gas turbine engine, wherein the operation of the gas turbine engine utilizes combustion in the combustor to drive a compressor of the gas turbine engine.

12. The turbine system of claim 8, wherein the measurement system is configured to operate independent of a control system of the gas turbine engine.

13. The turbine system of claim 8, wherein the circumferential cavity is one of a plurality of circumferential cavities defined within the inner surface of the compressor casing wall, each circumferential cavity of the plurality of circumferential cavities being spaced apart from each other in an axial direction relative to the longitudinal axis.

14. The turbine system of claim 13, wherein the sensor assembly comprises a plurality of sensor assemblies, each sensor assembly of the plurality of sensor assemblies comprising a respective plurality of sensors, wherein each sensor assembly of the plurality of sensor assemblies is configured to be removably inserted within a respective circumferential cavity of the plurality of circumferential cavities, wherein a respective circumferential track encloses each sensor assembly within the respective circumferential cavity when each sensor assembly is inserted into the respective circumferential cavity.

15. A method, comprising:
inserting a sensor assembly having a plurality of sensors into a cavity defined by both an inner surface of a compressor casing wall of a compressor casing of a compressor of a gas turbine engine and a circumferential track disposed within the casing wall without having to disassemble the compressor casing, wherein the compressor casing includes a single port coupled to the cavity through which the sensor assembly is inserted from outside the compressor casing, wherein the circumferential track extends along the compressor casing wall in direct contact with the compressor casing wall, and wherein the circumferential track encloses the plurality of sensors within the cavity; and acquiring, via the plurality of sensors, baseline data during an operation of the gas turbine for validating the operation of the gas turbine engine independent of a control system for the gas turbine engine, wherein the operation of the gas turbine engine utilizes combustion in a combustor of the gas turbine engine to drive the compressor; and removing the sensor assembly from the cavity, via the single port, from outside the compressor casing without having to disassemble the compressor casing.

16. The method of claim 15, wherein, after removing the sensor assembly from the cavity, without having to disassemble the collecting the baseline data from the plurality of sensors.

* * * * *